United States Patent [19]

Reuter

[11] 4,037,755
[45] July 26, 1977

[54] PNEUMATIC SEED DISPENSING APPARATUS

[75] Inventor: Floyd W. Reuter, Dearborn Heights, Mich.

[73] Assignee: Massey-Ferguson Inc., Detroit, Mich.

[21] Appl. No.: 653,675

[22] Filed: Jan. 29, 1976

[51] Int. Cl.² .......................... B65H 3/00; A01C 7/08
[52] U.S. Cl. ................................................ 221/211
[58] Field of Search .................... 221/211, 278; 211/77

[56] References Cited

U.S. PATENT DOCUMENTS

| 2,031,713 | 2/1936 | Johnson | 221/211 |
| 3,387,746 | 6/1968 | Whipple | 221/211 |
| 3,770,164 | 11/1973 | Hembree | 221/211 |

Primary Examiner—Allen N. Knowles
Attorney, Agent, or Firm—Robert L. Farris

[57] ABSTRACT

A mobile planter of the pneumatic type which has a rotating drum with seed receiving apertures arranged so that seed is deposited at an upper peripheral surface of the drum to be received in the seed receiving apertures. The exterior of the drum is maintained at a higher pressure than the interior of the drum so that the resultant pressure differential holds seeds in the apertures until they are released from the drum at the lowest point in the path of travel of the drum surface from which the seeds are conveyed by tubes utilizing the pressure at the exterior of the drum for deposit in the ground.

12 Claims, 3 Drawing Figures

PNEUMATIC SEED DISPENSING APPARATUS

This invention relates to mobile agricultural planters and more particularly to planters pneumatically depositing seed.

In a planting operation, particularly for a crop such as corn, it is desirable to deposit seeds in the ground singly and uniformly. Planting operations are enhanced if the seeds are of relatively uniform size. However, with most seed, and particularly in the case of corn, the kernels in the same ear of corn vary considerably in size between the tip and butt of the ear and it has been the practice to utilize only the kernels in the central portions of the ear for seed or to grade and size the seed into different sizes. However, the kernels of corn are genetically identical and it is highly desirable to use all kernels from an ear of corn without undergoing the expense of grading which requires additional handling and sometimes damage to the seed.

To obtain uniform distribution of seed, pneumatic planters have been utilized which incorporate a rotating member having apertures to receive single seeds which are subsequently separated from a rotating member and transported for deposit in the ground. Such planters, however, sometimes cause damage to the seed, particularly with such crops as peanuts in which the seed is fragile and is damaged by the tumbling action of the seed in the rotatable member.

It is an object of the invention to provide a pneumatic planter in which seed is conveyed to the outer periphery of a rotating drum for deposit in seed receiving apertures with a minimum of abrasion and damage to the seeds.

It is another object of the invention to provide a pneumatic seed planter in which the quantity of seed delivered to the area of the seed drum may be regulated.

Still another object of the invention is to provide a pneumatic seed planter in which differential air pressure is employed to secure a seed in position in a seed receiving aperture and to maintain it in position during its transport between a seed receiving area and a seed releasing area and in which the same pressure differential is used to convey seed from the release area to the ground.

The mobile seed planter of the present invention incorporates a rotating drum with seed receiving apertures such that seed is conveyed exteriorly of the drum to an upper peripheral surface for deposit in the apertures at a point in which the seeds are transported primarily horizontally and to a lesser degree vertically so that the forces of gravity assist holding the seeds in the apertures. The exterior of the drum is maintained at a higher pressure than the interior of the drum so that the resultant pressure differential acts on the seed in the apertures to hold them in position as they travel through the remainder of their peripheral path until they ultimately reach the lowest point of the path of travel at which they are released into seed conveying tubes which receive the higher air pressure at the exterior of the drum to assist in transporting the seeds through conveying tubes for deposit in ground.

Figure 1:
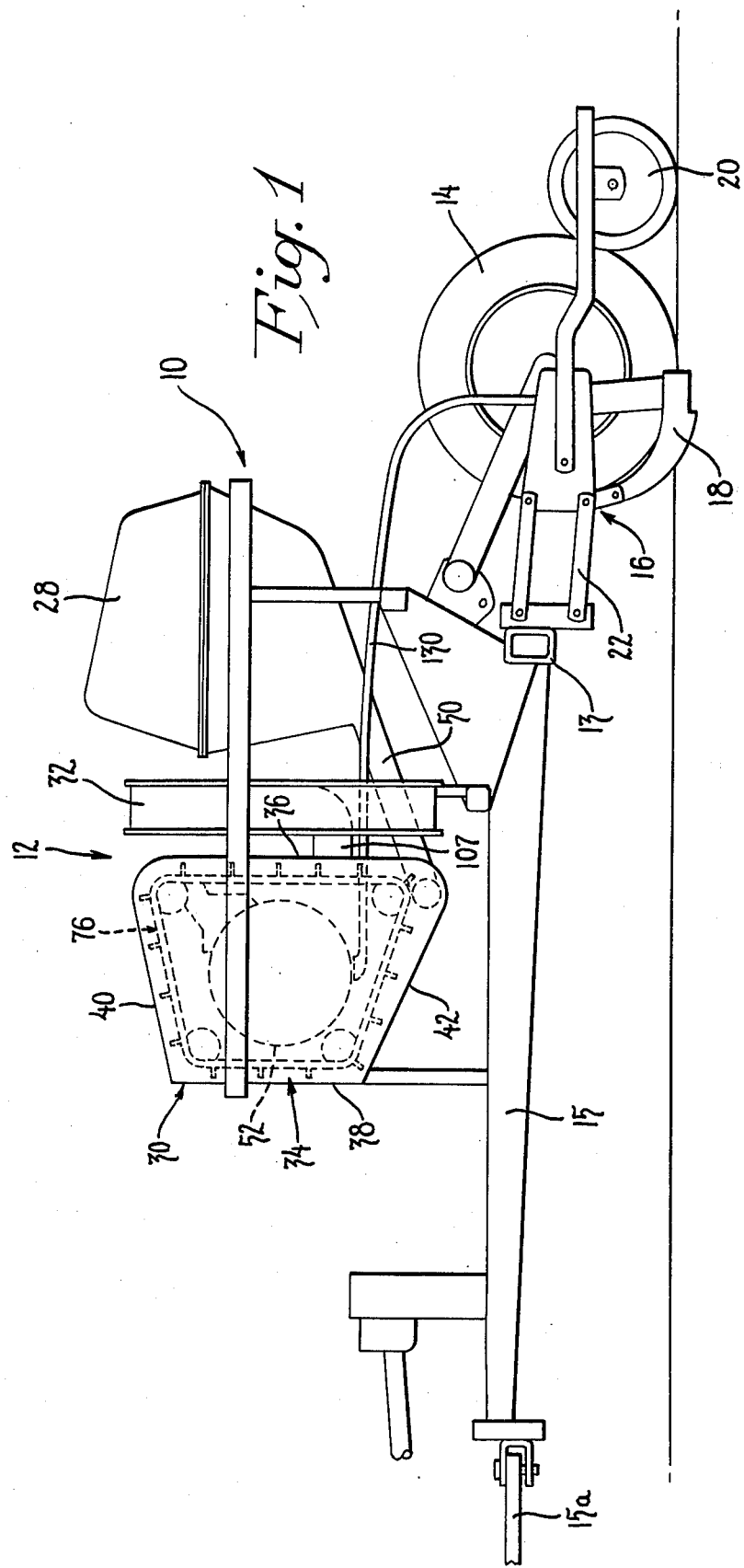
FIG. 1 is a side view of a mobile agricultural planter incorporating a pneumatic seed dispensing mechanism embodying the invention.

Referring to FIG. 1, a mobile planter 10 incorporating a seed dispensing mechanism embodying the present invention is designated by the reference 12. The planter is towed at the rear of an agricultural tractor and includes a transversely extending frame member 13 supported by ground engaging wheel 14 and a tongue 15 for connection to a tow bar 15a on a tractor. A plurality of planting units 16 only one of which is shown, extend rearwardly from the frame member 13. Each of the planting units 16 includes a furrow opening assembly 18 and a press wheel 20 which are supported relative to the frame 13 by a parallelogram linkage 22 permitting movement of the planter units 16 independently of each other as the planter 10 transverses a field in a planting operation. Disposed above the frame 13 is a seed hopper or storage bin 28 and mounted centrally of the planter 10 and above the tongue 15 is the seed dispensing mechanism 12.

The seed dispensing mechanism 12 includes a bin or seed hopper 28 in which seed is stored on the planter for delivery to a seed selector assembly 30 in which single seeds are selected and are transported by the use of air supplied by a blower 32.

The seed selector assembly 30 has a closed housing 34 fabricated of sheet metal and including vertical side walls 36 and 38, a top wall 40 and a bottom wall 42 which is inclined at a angle from the side wall 38 to the side wall 36. The walls 36, 38, 40 and 42 merge with end walls 44 and 46. The bottom wall 42 in addition to being inclined downwardly from the wall 38 to the wall 36 also is inclined from the opposite end walls 44 and 46 to form a seed receiving trough 48 at the bottom of the hopper. The trough 48 communicates by way of a seed delivery conduit 50 with the seed hopper 28 so that seed is conveyed from the latter to the seed trough 48.

Disposed within the housing 34 is a seed selector drum 52 which is generally cylindrical and has a closed end wall 54. The drum 52 is supported within the housing 34 for rotation with a shaft 56 extending axially of the drum 52 and projecting through the end wall 46. The shaft 56 is journaled to rotate within a tubular member 57 which is fixed stationary relative to the wall 46 and extends substantially the full axial length of the drum 52. The outer end of the shaft 56 is provided with a sprocket 58 which may be connected by a drive chain to a drive mechanism (not shown) for the purpose of rotating the drum 56 at a speed proportional to the rate of travel of the planter over the ground.

The end of the drum 52 adjacent to the end wall 46 has an annular wall portion 60. The end wall 46 is provided with an axially extending circumferential flange portion 62. The flange 62 supports an annular seal 64 having a flexible, resilient lip 66 engaging an outer surface of the annular wall 60 of the drum 52. The seal 64 serves to isolate the interior of the drum from a peripheral chamber 68 formed within the housing 34 and exterior of the drum 52.

The drum 52 is provided with several axially spaced rows of seed receiving apertures 70. The rows are uniformally spaced axially of the drum 52 and the apertures 70 in each row are uniformly and circumferentially spaced to travel in a path located in a vertical plane transverse to the axis of the drum 52. The apertures 70 are preferably of a size to receive and hold a single seed. The apertures 70 serve also to communicate the chamber 68 with the interior of the drum 52.

Disposed within the housing 34 and exterior of the drum 52 is an elevator arrangement 76 which includes a driving sprocket 78 disposed at an upper corner of the chamber 68. Idler sprockets 79, 80 and 81 are disposed at the remaining corners of the housing 34 and a chain 82 is trained over the sprockets. The chain is provided with a plurality of spaced paddles 84. The driving sprocket 78 is mounted on a shaft 86 which projects from the housing through the wall 46 and is provided with a sprocket 88 connected by means of a chain 90 to a relatively small sprocket 92 on the drum shaft 56 so that rotation of the drum 52 also serves to rotate the drive sprocket 78 but at a slower rotational speed.

Figure 2:
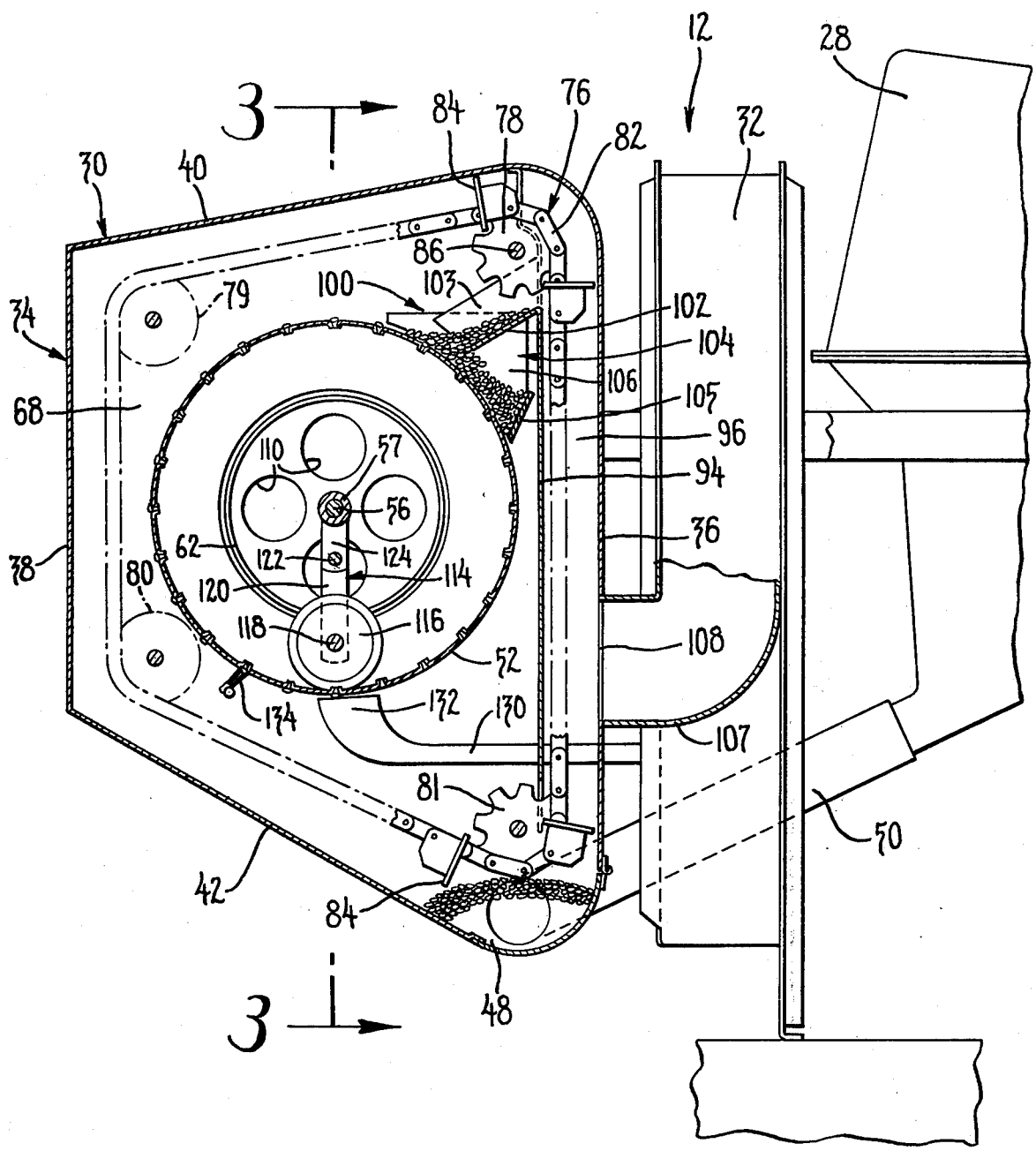
FIG. 2 is an enlarged sectional view showing the seed dispensing mechanism of the planter.
Figure 3:
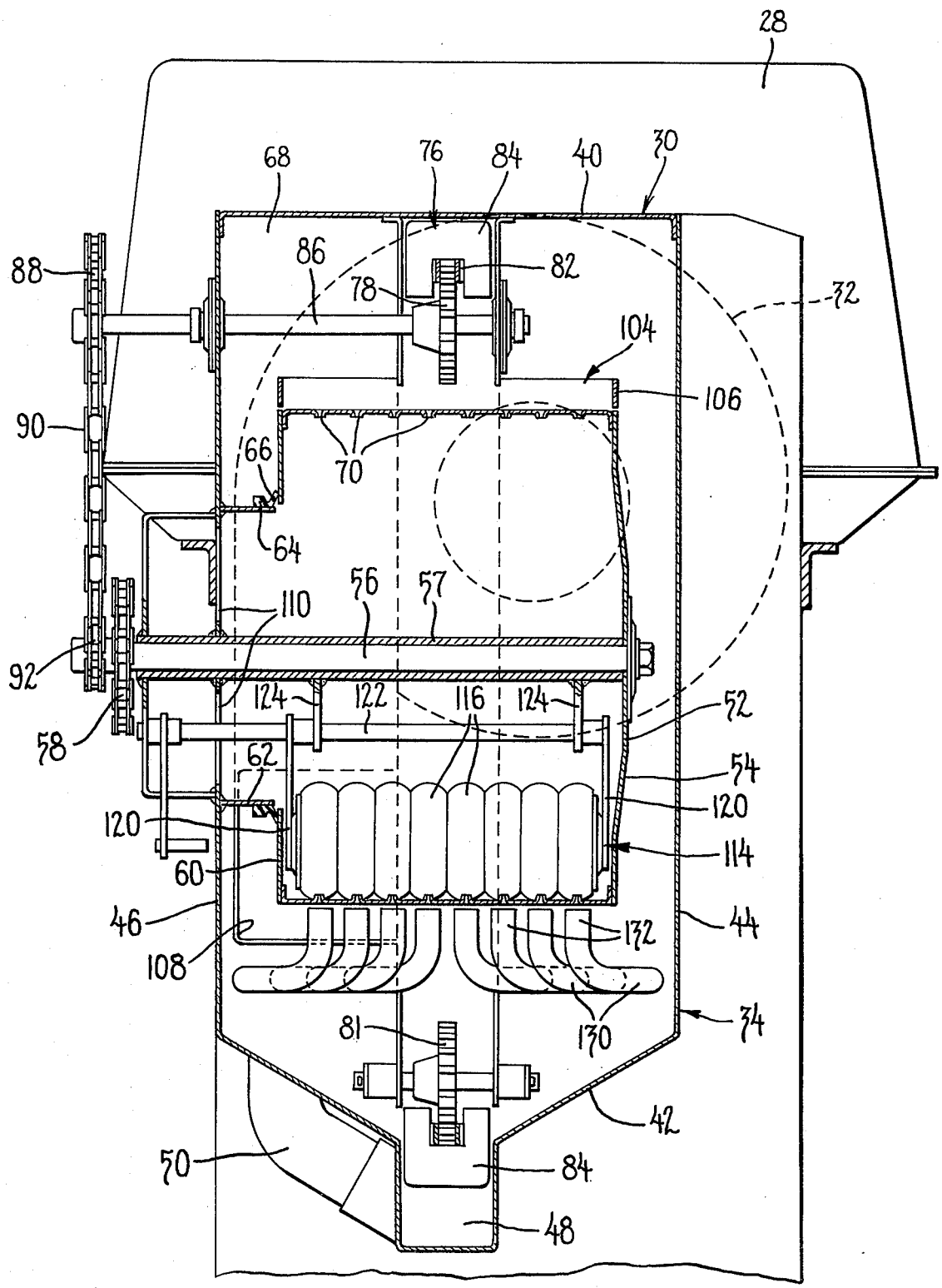
FIG. 3 is a sectional view taken generally on line 3 — 3 in FIG. 2.

As best seen in FIG. 2, rotation of the drum 52 in a counterclockwise direction serves to rotate the drive sprocket 78 in the same direction so that the elevator chain 82 moves in a substantially the same direction as the drum, that is, so that a flight portion of the chain between the drive sprocket 78 and idler sprocket 81 moves vertically upwardly to move the paddles 84 upwardly in a shaft 96 formed by the side wall 36 and an interior wall 94 to convey seed upwardly from the trough 48 to a seed distributing assembly indicated at generally 100.

It will be noted that the sprocket 92 on the shaft 56 is smaller than the sprocket 58 and the sprocket 88. This insures that for any given speed of the drum 52, the elevator 76 will transport seeds at a much slower speed. By properly selecting the size of the small sprocket it is possible to control the amount of seed conveyed to the seed distributor 100 to insure that an excess of seed does not accumulate and become subjected to tumbling or rubbing action which might injure the seed.

The seed distributing assembly 100 includes a downwardly sloping panel 102 merging with an upper end of the wall 94 and having side walls 103 to form a trough which receives seeds dropped by the paddles 84 as they move from their generally horizontal position in the shaft 96 to a generally vertical position. The seeds flow downwardly on the trough towards the surface of the drum 52. Mounted adjacent to the surface of the rotating drum is a rack 104 having side walls 106 adjacent opposite axial edges of the drum and a rear wall 105 extending axially of the drum. Seed delivered by the elevator 76 to the trough is dispersed in the rack 104 over the exterior circumferential surface of the drum 52 at an area in which the moving drum surface is reaching its highest point in its orbit so that seeds which become lodged in the apertures 70 and move with the drum are elevated only a slight amount but are moved a greater distance horizontally. Air from the blower 32 is delivered by way of a conduit 107 to an air delivery port 108 and into the chamber 68. In the absence of seeds in the planter and more specifically in the apertures 70, air is free to flow from the chamber 68 through the apertures 70 to the interior of the drum 52 and to pass to the atmosphere through exhaust ports 110 in the wall 46. The exhaust ports 110 communicate only with the interior of the drum and serve to maintain the interior of the drum 52 at or near atmospheric pressure.

As the drum 52 rotates and as seeds become positioned within the apertures 70, the positive pressure within the chamber 68 and the atmospheric pressure within the drum 52 creates a pressure differential tending to hold the individual seeds in position within the apertures 70 and on the outer surface of the drum. The seeds remain in position within the apertures until they have been transported with the rotating drum to the lowermost point on the periphery of the drum at which they are separated from the drum by a seed release mechanism designated 114.

The seed release mechanism 114 includes a plurality of rollers 116, one for each of the rows of apertures 70. The rollers are disposed for rotation on a shaft 118. Opposite ends of the shaft 118 are supported by brackets 120 which are fixed to opposite ends of a parallel shaft 122. The shaft 122 is supported for pivoting in a pair of brackets 124 fixed to the tubular member 57 journaling the shaft 56. This arrangement suspends the rollers 116 so that they contact the inner periphery of the drum 52 and serve to close each aperture 70 as it passes under a roller. This closes the aperture and eliminates the pressure differential acting at opposite sides of the aperture so that any seed positioned within the aperture will drop from the surface of the drum. In the event the seed or any portion thereof projects slightly to the interior of the drum, the roller 116 also tends to engage and mechanically dislodge the seed from the drum 52.

It will be noted that the rollers 116 are suspended about a shaft which may be pivoted about the parallel shaft 122. The shaft 122 has its axis spaced from the shaft 56 of the drum 52 and as a consequence all of the rollers 116 may be pivoted manually out of engagement with the inner periphery of the drum to facilitate the removal of the drum 52 when it becomes necessary to substitute another drum having different size seed receiving apertures 70 for utilization of other types of seed.

Positioned at the underside of the rotating drum 52 and in alignment with each row of apertures 70 and with each roller 116 is a seed conveying tube 130. Each of the tubes 130 is provided with an enlarged funnel-like elongated inlet portion 132 to receive seeds which drop from the surface of the drum. The funnel portion 132 converges into a tube section of generally uniform cross section which is flexible and extends to one of the furrow openers 18.

The funnel ends 132 of the tubular members 130 are spaced in close proximity to the surface of the drum 52 to insure clearance for seeds held on the periphery of the drum as they approach the funnels. The clearance also serves to afford admission of air at positive pressure within the chamber 68 and into the tube 130 to facilitate air conveyance of seeds within the tubes.

Disposed within the chamber 68 at the underside of the drum 52 is a brush member 134 which extends parallel to the axis of the drum with its bristles extending to the peripheral surface of the drum. The brush functions to remove any excess seeds which may be adhered to the surface of the drum or if more than one seed is associated with a particular aperture 70 the brush serves to remove the excess seed to insure that a single seed is associated with the aperture.

During the planting operation as the planter is moved across the field, the drum 52 rotates within the chamber 68 and the blower 32 is driven to create a pressure differential between the chamber 68 and the interior of the drum. Seed from the hopper 28 flows through the conduit 50 to the trough 48 at the bottom of the housing 34 where it is picked up by paddle members 84 of the elevator 76 and conveyed upwardly in the shaft 96 for deposit in the rack 104 at an upper peripheral surface of the drum 52. Seeds accumulated in the rack 104 find their way into the apertures 70 are conveyed at the top of the drum primarily horizontally and slightly upwardly. As the seeds leave the rack 104 the seeds are maintained in the apertures 70 not only by the force of gravity but also by the pressure differential between the chamber 68 and the interior of the drum 52. The pressure differential is sufficient to maintain the seeds in position as they move in a path toward the release mechanism 114. Any excess seeds on the surface of the drum will fall to the bottom of the housing 34 and be conveyed by the inclined bottom wall 42 to the trough 48. If more than one seed is held in place in an aperture 70 the excess seed is removed by the brush 134 and likewise falls to the trough 48 to be reconveyed by the elevator 76 to the upper part of the housing 34. Seeds in the apertures 70 are released at the bottom of their peripheral path by the release mechanism 114 and are conveyed by air from the chamber 68 through the flexible seed conveying tubes 130 which are associated with each of the furrow openers 18 for the deposit of seeds in the ground.

A mobile seed planter has been provided which utilizes air to select single seeds and to uniformly distribute them in the ground. The planter incorporates a rotating drum, the interior of which is maintained at a low pressure and the exterior of which is maintained at a higher pressure with the pressure differential acting to hold the seeds on the outer peripheral surface of the drum until they are released by a mechanism which eliminates the pressure differential. The positive air pressure at the exterior of the drum also is used to convey seed uniformly in tubes for distribution in the ground. Seed from a storage hopper is conveyed gently to a peripheral surface of the drum at which the seed requires transport upwardly only a slight amount and at which the principal direction of travel of the seed is in a horizontal direction so that the seed is subject to a minimum abrasion and the forces of gravity act to initially secure the seed in seed receiving apertures.

The embodiments of the invention in which an exclusive property or privilege is claimed are defined as follows:

1. A seed dispensing apparatus comprising: a housing, a drum supported in said housing for rotation about a horizontal axis, said drum and said housing forming a chamber therebetween, means to maintain said chamber at a higher pressure than the pressure in said drum, said drum having uniformly spaced openings disposed in the periphery of said drum and in a common plane disposed transversely to the axis of said drum, said openings communicating said chamber with the interior of said drum, means to convey seed to said chamber and to an upper circumferential surface exterior of said drum for depositing a seed in each of said openings, said seed being maintained in said openings by differential pressure in said chamber and in said drum, a rack assembly positioned in close proximity to the exterior of said rotating drum at said circumferential surface, said rack assembly being operative to receive seed conveyed by said means conveying seed for distribution in said openings, and discharge means positioned in said drum to close said openings when said openings reach a predetermined position to eliminate said pressure differential and permit said seeds to be separated from said drum.

2. The combination of claim 1 and further comprising conduit means to convey seed from said chamber after separation at said predetermined position.

3. The combination of claim 2 in which said conduit means include a seed conveying conduit having one end positioned adjacent said drum at said predetermined position in the interior of said chamber.

4. The combination of claim 3 in which the other end of said seed conveying conduit is open to the atmosphere and in which air pressure in said chamber conveys the seed in said conduit.

5. The combination of claim 1 in which said means to convey seed includes elevator means for raising seed from the bottom of said chamber to said upper circumferential surface of said drum.

6. The combination of claim 1 and further comprising means to remove excess seeds from the surface of said drum in the area of said openings.

7. The combination of claim 6 in which said means for removing excess seeds is in the form of a brush member engageable with the outer circumferential surface of said drum at a point before said opening approaches said discharge means.

8. The combination of claim 7 in which said elevator means comprises a chain driven plurality of paddles, said paddles being operative to engage and convey seeds upwardly in said chamber and to deposit them on the surface of said drum at an upper portion of said chamber.

9. The combination of claim 1 in which said discharge means comprise a roller positioned within said drum and in said common plane for engagement with the inner surface of said drum for rotation thereby.

10. The combination of claim 9 in which said discharge means roller is engageable with said inner surface of said drum at the lowest point of said drum.

11. The combination of claim 1 in which said drum communicates with the atmosphere and in which said means to maintain said chamber at a higher pressure includes blower means.

12. The combination of claim 1 in which said drum has a plurality of rows of openings, each row of openings being uniformly spaced in a common plane, said rows being spaced axially of said drum for receiving seed from said circumferential upper surface and said discharge means being operatively associated with each of said rows.

* * * * *